Figures 1, 2:
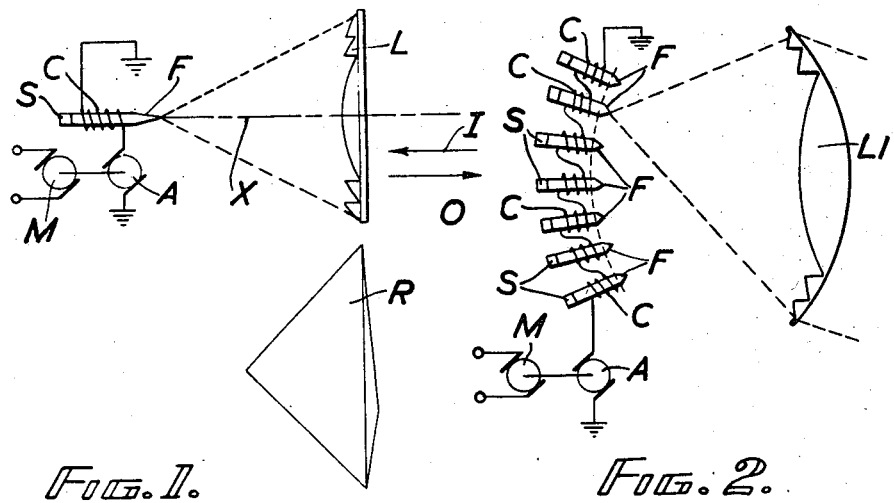

United States Patent Office 2,850,728
Patented Sept. 2, 1958

2,850,728
RADIO NAVIGATION AIDING DEVICES

Peter Maurice Wright, Great Waltham, and John Forrest Ramsay, Great Baddow, England, assignors to Marconi's Wireless Telegraph Company Limited, London, England, a British company Application August 15, 1955, Serial No. 528,434

Claims priority, application Great Britain September 14, 1954

8 Claims. (Cl. 343—18)

This invention relates to radio navigation aiding devices and has for its main object to provide simple, easily maintained, nearly passive unattended radio responsive navigation aiding devices which can be fitted to light ships, buoys and other navigation aids, and which when interrogated by a radar system will give a response that will enable the aid to which it is fitted to identify itself to a desired extent, at least to the extent of showing itself to the interrogating radar in a manner which will distinguish it from other targets. A radio responsive navigation aiding device in accordance with this invention requires no locally energized radio transmitter but only a simple modulating device and so is almost completely passive. An important advantage of the invention is that it enables navigation aids to identify themselves to the desired extent whether the interrogating radar system is of the pulse type now usual for marine and other purposes or of the continuous wave type. Another important object of the invention is to provide an improved pulsed radar system capable of interrogating a radio navigation aiding device in accordance with this invention and which shall differ so little from a normal existing pulse radar system as to enable such a system to be adapted to the purposes of this invention easily and cheaply.

According to the main feature of this invention a radar responsive navigation aiding device comprises means for receiving and reflecting an incident radio wave back towards the source thereof, and means for applying, independently of the direction of the incident wave, characteristic pre-determined phase modulation to less than half the reflected wave energy, the remaining, major, part part of the reflected wave energy being substantially unmodulated. The simplest way of characterizing the phase modulation is to effect it as a pre-determined characterizing audio frequency.

Probably the most important advantage of the invention, namely, that it will respond when interrogated by only a slightly modified pulse radar, arises by reason of the fact that since the reflected wave energy will consist of a major unmodulated part and a remaining, smaller, phase modulated part, the modulated and unmodulated parts will beat together to give a resultant beat due to the phase modulation and this can be readily separated at an interrogating pulsed radar by merely adding to that radar a circuit fed from the normal video channel thereof and selective to the beat frequency.

Where the invention is applied to a device such as a buoy whose radio reflecting area is comparatively small it will be necessary to provide means specially to ensure that the unmodulated reflected wave energy will be stronger than the modulated reflected wave energy. Where, however, the invention is applied to a large area device, e. g. where the invention is applied to a lightship, the ship herself will provide a sufficiently strong unmodulated reflected wave so that the provision of special means for this purpose is unnecessary.

Preferably the phase modulating means comprises a length of wave propagation material constituted by ferrite and upon which an incoming radio wave is directed, said length being terminated by a wave reflecting short circuit and being provided with a magnetizing coil through which a characteristic modulating frequency is applied so that when the modulation is applied the effective electrical length of the ferrite is modulated and the phase of the reflected wave in relation to the incident wave is varied at the modulating frequency. In the simplest case the modulating frequency is provided by a motor driven alternator which can be quite small since the power loading thereon is very little. It is, however, by no means an essential part of the invention that the phase modulating means be of the ferrite type just described for any suitable phase shifter or line stretcher known per se and capable of modulation control at audio or low frequency may be used instead e. g. a phase shifting or line stretching device of the gas discharge tube type or of the type comprising a wave-guide with a movable vane or other insert or of the type comprising a transmission line of mechanically variable length.

A plurality of radio navigation aiding devices in accordance with this invention may be applied to the same navigation aid and pointed in different directions so as to make the aid "all round looking," i. e. responsive to interrogation from any direction. Also one or more devices in accordance with this invention may be mounted as a unit and rotated in azimuth so as to be analogous to the rotating optical system of a lighthouse. By suitably choosing the number and arrangement of the devices in such a unit and the speed of rotation, identification may be facilitated by imparting "character" and "period" analogous to the "character" and "period" whereby an ordinary visible navigation aiding light identifies itself.

Figure 5:
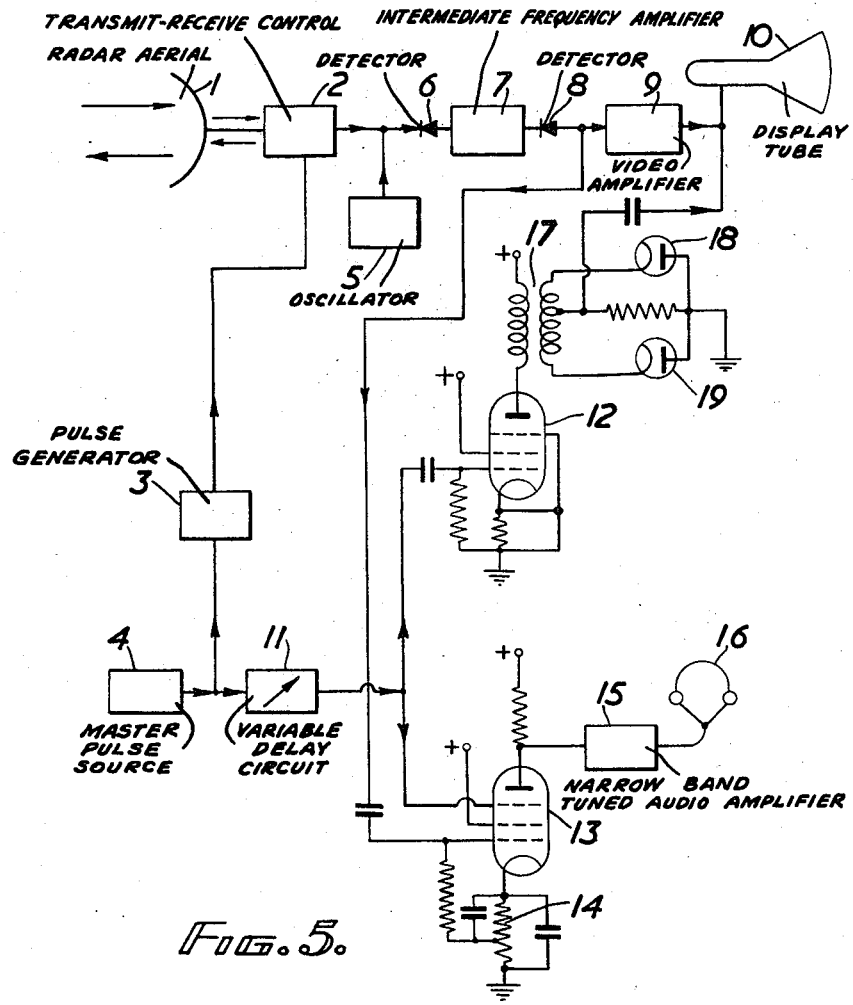

The invention is illustrated in the accompanying drawings. In these drawings, which are numbered consecutively for convenience, Figs. 1, 2, 3 and 4 show schematically examples of the various forms which the invention may take when applied to a radar responsive self identifying navigation aiding device, Fig. 5 is a much simplified diagram showing, so far as is necessary to an understanding of the present invention, a pulse radar system modified in accordance with this invention so as to be capable of interrogating a device as shown in any of Figs. 1 to 4, and Fig. 6 shows schematically a device generally similar to that of Fig. 1 except that the modulating means is in the form of a waveguide with a mechanically driven vane insert instead of being of the ferrite type.

Referring to Fig. 1 which shows part of an installation suitable for fitting to a buoy, there is provided a dielectric lens L of known form whose axis is indicated at X and at the focus of which is one end of a ferrite rod F the other end of which is provided with a metal short-circuiting cap S. Wound about the rod F is a magnetizing coil C through which a suitable alternating voltage is applied in series with a suitable bias (from a source not shown) by a small alternator A and driven by a small motor M. The motor-alternator set is arranged to produce a pre-determined frequency, e. g. 300 C./S., though, as will be apparent later, no very close stabilization of frequency is required. Adjacent the lens shown at L is an ordinary corner reflector R shown conventionally below the lens L.

Suppose an incident wave from an interrogating radar set falls upon the lens L and upon the reflector R, as indicated by the arrow I. Most of the reflected energy (represented by the arrow O) will be from the reflector R and will be unmodulated. The alternating voltage applied to the coil C, however, varies the effective length of the rod F (regarded as a wave propagating material)

in accordance with well known principles and accordingly the time taken by a wave to travel along the rod to the short S and back again will be modulated, so that the reflected wave sent back through the lens L will be phase modulated. The total reflected energy O will consist of the unmodulated component from the reflector R and the phase modulated component from the lens L and, as already stated, the former is arranged to be substantially more powerful than the latter. Where the apparatus is applied to a good reflecting target, such as a metal light ship, a corner reflector R or equivalent device will not be necessary since the vessel herself will provide a sufficiently strong unmodulated signal.

Suppose an apparatus as shown in Fig. 1 is interrogated by a continuous wave (CW) radar. Then the phase modulation can be directly detected at the radar since the reflected wave received thereby will be an ordinary phase modulated CW wave. Suppose, however, the interrogating radar is of the customary non-coherent pulse type so that there is no "carrier." Nevertheless the fact that there is a strong reflected unmodulated pulse as well as a phase modulated pulse will cause the production in space of a beat frequency equal to the frequency of the phase modulation and if the set is adapted so that it can select and detect this frequency it can identify the navigation aid from which it comes.

Fig. 5 shows a pulse radar adapted in this way in accordance with the invention. This set also includes means whereby selection (for interrogation purposes) of a number of targets may be made.

Referring to Fig. 5, 1 is the usual radar aerial connected to a transmit-receive (TR) box 2 into which a pulse transmitter 3 driven by a master pulse source 4 feeds. The received output from the TR box 2, after heterodyning by a local oscillator 5, is passed through a first crystal detector 6 followed by an intermediate frequency amplifier 7 which in turn feeds into a second crystal detector 8 followed by a video amplifier 9. The video amplifier output is taken to the brightness control grid of a P. P. I. display tube 10 which is operated in the usual well known way. The apparatus of Fig. 5 as so far described, is, of course, well known and, being normal pulse radar practice, requires no further description. The additional apparatus now to be described is provided for the purpose of the present invention.

This additional apparatus includes a variable delay circuit 11 fed from the master pulse source 4 and whose delayed output is taken in parallel to the control grid of a pentode 12 and the suppressor grid of a pentode 13. Video signals from the output of the second detector 8 are also applied to the control grid of the pentode 13. The cathode resistance 14 of the latter pentode is of high enough value to hold the valve normally cut off but when a pulse is applied from the delay line 11 to the suppressor grid the said valve 13 is no longer cut off and passes the video signal applied to its control grid. The passed video signal from the anode is fed to a relatively narrow band tuned audio amplifier 15 which is tuned to the characteristic frequency (assumed 300 C./S.) of the navigation aiding device to be interrogated and feeds its output to any suitable indicator represented simply by a pair of telephones 16. The amplifier 15 may be adjustable in frequency to meet the possibility that there may be a number of different navigation aiding devices with different characterizing modulation frequencies.

The anode circuit of the pentode 12 contains a mutual inductance differentiator arrangement 17 as well known per se and so arranged that a rectangular pulse applied to the control grid of the valve 12 appears in the output circuit thereof as two sharp peaks of voltage, one positive going and one negative going, corresponding to the leading and trailing edges of the pulse. The negative going peak of voltage is reversed in sign by any convenient arrangement such as the well known circuit shown including the diodes 18, 19, with their common load resistance. The output from this circuit is applied to the brightness control grid of the P. P. I. tube 10. Thus each pulse from the delay circuit 11 will produce two positive going voltage peaks at the brightness control grid of the tube 10. As will be readily seen the arrangement including the circuit 11, valve 12 and circuits associated therewith provide a range gate and by adjusting the delay produced by the circuit 11 marks may be caused to appear on the screen of the tube 10 on either side of any desired target shown thereon while signals heard in the phones 16 will be due to reflection from the target thus selected. If, therefore, it is desired to pick out some particular target position on the screen for interrogation this can readily be done.

A number of installations as shown in Fig. 1, pointing in different directions of azimuth may be mounted as a unit on a navigation aid. Such a unit may, if desired, be mechanically rotated at a known pre-determined speed in manner analogous to the rotation of the optical system of a lighthouse, or a single apparatus as shown in Fig. 1 may be rotated in azimuth. Where a number of arrangements as shown in Fig. 1 are fitted to the same navigation aid, all the ferrite rods will, in general, be modulated with the same frequency from the same modulating source.

Fig. 2 illustrates a modification of the arrangement of Fig. 1. The modification consists in using a wide angle lens L1 instead of the lens L and providing a number of ferrite rods F each like that shown in Fig. 1 with their ends distributed over the focal surface (shown dotted) of the lens L1. Thus incoming radio beams from any direction within a wide angle will be reflected back whence they come. All the ferrites are modulated together with the same frequency, the coils thereon being shown in Fig. 2 as connected in series.

Figures 3, 4:
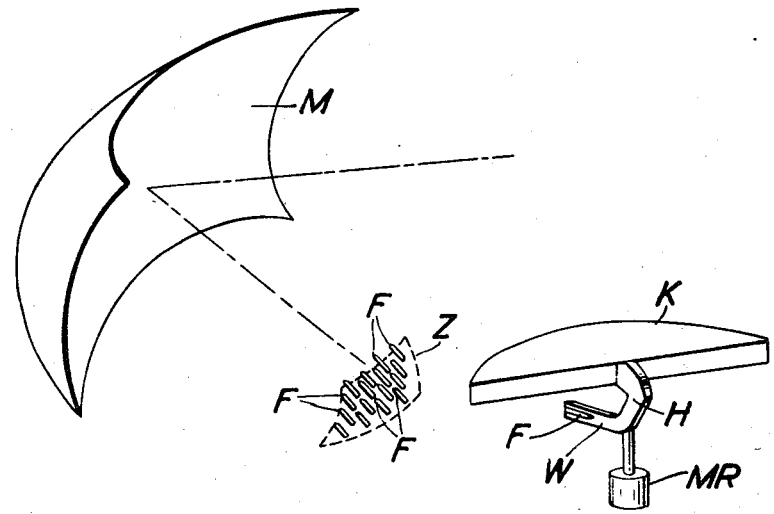

Instead of using a lens as in Figs. 1 and 2 a mirror may be used. This is schematically illustrated in Fig. 3 in which M is a mirror upon which the incoming interrogating radiation is incident there being a number of ferrite rods F arranged and operated as already described and distributed over the focal surface Z (shown dotted) of the mirror. For simplicity in Fig. 3 the rods F are only schematically represented.

Fig. 4 shows yet another modification. Here the navigation aid is fitted with a cylindrical structure K with the customary radio horn, H. This horn terminates in a length of wave guide W at the far end of which is a short circuited modulated ferrite rod F arranged and operated as previously described. The cylindrical structure will accordingly receive incoming radio waves and reflect them back with phase modulation. As in Fig. 3, the rod F in Fig. 4 is shown simply as a pencil though, in both cases, the rods are arranged and operated as in Fig. 1. In Fig. 4 MR is an electric motor which rotates the cylindrical structure, horn and guide as a unit in azimuth at a pre-determined speed. Two arrangements as shown in Fig. 4 could, if desired, be arranged back to back and rotated as a unit or such a rotatable unit might comprise four such cylindrical structures arranged at the sides of a square and pointing outwards. Indeed any of the arrangements shown in Figs. 1 to 4 may be provided in multiple and pointed in different directions and rotated as a unit.

Although in the preceding description it has been assumed that the characterizing signal is a simple alternating frequency the invention is, of course, not limited to this and other characterizing signals, for example Morse signals, may be superimposed. Further where CW interrogated radars are employed, a navigation aid in accordance with this invention may be used also as part of a speech communication channel for if speech is superimposed (on, for example, the coil C of Fig. 1)

an interrogating CW radar will be able to receive that speech.

Figure 6:
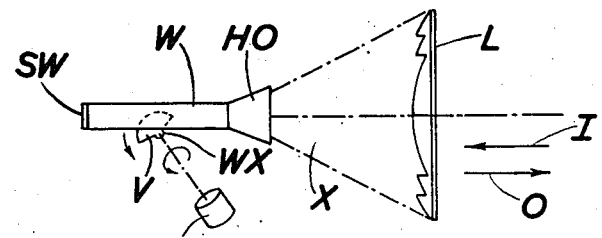

As already stated other forms of modulator may be used in place of the ferrite modulators of Figs. 1 to 4 and any of the arrangements shown in these figures may be modified by substituting such other forms of modulator. Fig. 6 shows an arrangement as shown in Fig. 1 but modified in this manner. In Fig. 6 the lens L is focussed on a horn HO at the end of a short length of wave guide W terminated by a reflecting short circuit SW. The waveguide is slotted and an insert vane V, rotated at pre-determined speed by a motor MR about an axis WX, is arranged to enter the slot so that the degree of penetration of the vane into the guide is varied cyclically as the vane (which may be of metal or dielectric) rotates. This, of course, varies the electrical length of the waveguide and therefore produces phase modulation in the energy reflected out again from the horn HO through the lens L.

We claim:

1. A radar responsive navigation aiding device comprising means for receiving and reflecting an incident radio wave back towards the source thereof, said means comprising a reflector and a reflector-modulator the latter being adapted to reflect less than half the total reflected wave energy, and phase modulating means to apply characteristic predetermined phase modulation to the energy reflected by said reflector-modulator, the remaining major part of the reflected wave energy as reflected by said reflector being substantially unmodulated.

2. A pulse radar responsive navigation aiding system comprising means for receiving and reflecting an incident radio wave back towards the source thereof, said means comprising a reflector and a reflector-modulator the latter being adapted to reflect less than half the total reflected wave energy, and phase modulating means to apply characteristic predetermined phase modulation to the energy reflected by said reflector-modulator, the remaining major part of the reflected wave energy as reflected by said reflector being substantially unmodulated, and receiver means for the reflected wave energy wherein gated means are provided for rendering said receiver means operative during periods of reception of the indivdual reflected pulses whereby said characteristic modulation is detectable.

3. A device as set forth in claim 2 wherein the phase modulating means comprise a length of wave propagation material constituted by ferrite and upon which an incoming radio wave is directed, said length being terminated by a wave reflecting short circuit and being provided with a magnetizing coil through which a characteristic modulating frequency is applied.

4. A device as set forth in claim 2 wherein the phase modulating means comprise a length of wave guide fed at one end with interrogating radio energy and terminated at the other by a reflector, said guide being equipped with a motor-driven variable insert to vary the electrical length thereof thereby to produce phase modulation.

5. A device as set forth in claim 1 wherein the phase modulating means comprise a length of wave propagation material constituted by ferrite and upon which an incoming radio wave is directed, said length being terminated by a wave reflecting short circuit and being provided with a magnetizing coil through which a characteristic modulating frequency is applied.

6. A device as set forth in claim 1 wherein the phase modulating means comprise a length of wave guide fed at one end with interrogating radio energy and terminated at the other by a reflector, said guide being equipped with a motor-driven variable insert to vary the electrical length thereof thereby to produce phase modulation.

7. A device as set forth in claim 1 and comprising a plurality of phase modulating means distributed over the focal surface of a lens or reflector and modulated together.

8. A system as set forth in claim 1 and comprising a pulse radar equipped with means for detecting a beat signal produced by the beating together of the modulated and unmodulated reflected energies from a device being interrogated.

References Cited in the file of this patent

UNITED STATES PATENTS

| 2,472,782 | Albersheim | June 14, 1949 |
| 2,520,008 | King | Aug. 22, 1950 |
| 2,543,130 | Robertson | Feb. 27, 1957 |